US010005206B2

(12) United States Patent
Kitamura (10) Patent No.: US 10,005,206 B2
(45) Date of Patent: Jun. 26, 2018

(54) METHOD FOR FORMING CYLINDRICAL RUBBER MEMBER (71) Applicant: TOYO TIRE & RUBBER CO., LTD, Osaka-shi, Osaka (JP)

(72) Inventor: Takashi Kitamura, Osaka (JP)

(73) Assignee: TOYO TIRE & RUBBER CO., LTD., Itami-shi (JP)

( * ) Notice: Subject to any disclaimer, the term of this patent is extended or adjusted under 35 U.S.C. 154(b) by 516 days.

(21) Appl. No.: 14/369,992

(22) PCT Filed: Mar. 19, 2013

(86) PCT No.: PCT/JP2013/057897
§ 371 (c)(1),
(2) Date: Jun. 30, 2014

(87) PCT Pub. No.: WO2013/157343
PCT Pub. Date: Oct. 24, 2013

(65) Prior Publication Data
US 2015/0008618 A1 Jan. 8, 2015

(30) Foreign Application Priority Data

Apr. 16, 2012 (JP) ................................. 2012-092853

(51) Int. Cl.
B29C 41/08 (2006.01)
B29C 47/92 (2006.01)
(Continued)

(52) U.S. Cl.
CPC .......... B29C 41/085 (2013.01); B29C 47/364 (2013.01); B29C 47/38 (2013.01);
(Continued)

(58) Field of Classification Search
CPC .................................................. B29C 41/085
See application file for complete search history.

(56) References Cited

FOREIGN PATENT DOCUMENTS

JP 6-71587 A 3/1994
JP 2002-46194 A 2/2002
(Continued)

OTHER PUBLICATIONS

Office Action dated Jun. 3, 2015, issued in counterpart Chinese Patent Application No. 201380004055.3 w/English translation (13 pages).
(Continued)

Primary Examiner — Larry Thrower
(74) Attorney, Agent, or Firm — Westerman, Hattori, Daniels & Adrian, LLP (57) ABSTRACT A method for forming a cylindrical rubber member includes bringing a die 11 close to a forming drum 2, forming a winding start portion S1 by extruding a rubber S and simultaneously starting to rotate the forming drum 2 to gradually increase an extruding amount to an amount Q1 and gradually increase a distance between the die 11 and the forming drum 2 to a distance D2 corresponding to a desired thickness of the cylindrical rubber member, winding the rubber S by maintaining the extruding amount at the amount Q1, and maintaining the distance between the die 11 and the forming drum 2 at the distance D2, and forming a winding end portion S2 on the winding start portion S1 by maintaining the distance between the die 11 and the forming drum 2 at the distance D2 and gradually reducing the extruding amount from the amount Q1.

5 Claims, 4 Drawing Sheets (51) Int. Cl.
| | |
|---|---|
| *B29D 30/30* | (2006.01) |
| *B29D 30/62* | (2006.01) |
| *B29C 47/36* | (2006.01) |
| *B29C 47/38* | (2006.01) |
| *B29C 47/60* | (2006.01) |
| *B29D 23/00* | (2006.01) |
| *B29L 23/00* | (2006.01) |

(52) U.S. Cl.
CPC .......... *B29C 47/6068* (2013.01); *B29C 47/92* (2013.01); *B29D 23/00* (2013.01); *B29D 30/3007* (2013.01); *B29D 30/62* (2013.01); *B29C 2947/9259* (2013.01); *B29C 2947/92514* (2013.01); *B29C 2947/92571* (2013.01); *B29C 2947/92885* (2013.01); *B29C 2947/92933* (2013.01); *B29C 2947/92952* (2013.01); *B29L 2023/00* (2013.01)

(56) References Cited

FOREIGN PATENT DOCUMENTS

| | | |
|---|---|---|
| JP | 2004-82436 A | 3/2004 |
| JP | 2008-23847 A | 2/2008 |
| JP | 2010-234707 A | 10/2010 |
| JP | 2011-173369 A | 9/2011 |

OTHER PUBLICATIONS

Notification of Transmittal of Translation of the International Preliminary Report on Patentabililty (Form PCT/IB/338) of International Application No. PCT/JP2013/057897 dated Oct. 30, 2014 with Forms PCT/IB/373 and PCT/ISA/237.

International Search Report dated Apr. 16, 2013 issued in corresponding application No. PCT/JP2013/057897.

METHOD FOR FORMING CYLINDRICAL RUBBER MEMBER

TECHNICAL FIELD

The present invention relates to a method for forming a cylindrical rubber member by winding rubber extruded by an extruder through a die around a rotation-supporting body, and by bonding a winding start portion and a winding end portion to each other to form a cylindrical shape.

BACKGROUND ART

In a conventional method for manufacturing tires, for example, a cap tread is formed such that rubber is extruded from an extruder onto a conveyer and is cut into a length corresponding to one tire, the cut rubber is conveyed to a forming step, and the rubber is adhered to a previously formed belt member called a first case and formed into a cylindrical shape (e.g., Patent Document 1 listed below).

There is also known a forming method in which a strip-shaped ribbon rubber extruded from an extruder is spirally wind around a forming drum and laminated into a desired shape (e.g., Patent Document 2 listed below).

There is also a method in which a plurality of dies are placed on an outer circumferential surface of a forming drum after a cylindrical base member is formed, to extrude rubber from an extruder which is adjacent to these dies, and the rubber is sandwiched under pressure between the die and the drum while rotating and driving the drum, to wind the rubber around the cylindrical base member (e.g., Patent Document 3 listed below).

According to the forming method of Patent Document 1, there is a problem that costs are increased since a cutting device for cutting rubber into a length corresponding to one tire is additionally required, and space or conveying equipment for storing and conveying the cut rubber is required in some cases.

Further, if rubber is cut using the cutting device, stress relaxation occurs around the cut portion, and dimension change is generated, which leads to deterioration in tire uniformity. Furthermore, a thickness of a joint (joint portion) between a winding start portion and a winding end portion is increased, and this may cause deterioration in tire uniformity. A level difference is generated at the joint, and this may cause incorporation of air at the time of vulcanization, or may cause a crack or peel-off at the joint.

In the method of extruding the ribbon rubber into the strip shape and spirally winding the rubber around the drum several times described in Patent Document 2, there is a tendency that cycle time becomes long. In order to avoid this, the rubber is extruded at high extruding (shearing) speed, and there is a concern that rubber burns by generation of heat.

According to the forming method of Patent Document 3, since a distance from the extruder to the die is long, a temperature of the molten rubber drops until the rubber is sandwiched, and this increases rubber viscosity. Therefore, it is difficult to sandwich the rubber between the die and the drum such that a desired rubber thickness is obtained, and there is a concern that a level difference is generated particularly at the joint.

PRIOR ART DOCUMENTS

Patent Documents

Patent Document 1: JP-A-06-71587
Patent Document 2: JP-A-2002-46194
Patent Document 3: JP-A-2004-82436

SUMMARY OF THE INVENTION

Problems to be Solved by the Invention

The present invention has been accomplished in view of the above circumstances, and an object thereof is to provide a method for forming a cylindrical rubber member capable of keeping a width of the rubber member constant, eliminating a level difference at a joint between a winding start portion and a winding end portion, and forming the rubber member into a predetermined thickness over its entire circumference.

Means for Solving the Problems

In order to solve the problem mentioned above, the method for forming a cylindrical rubber member of the present invention is a method for forming a cylindrical rubber member in which rubber extruded by an extruder through a die is wound around a rotation-supporting body, and a winding start portion and a winding end portion are bonded to each other to form a cylindrical shape, the method including a preparation step of bringing the die close to the rotation-supporting body, a winding start step of forming a winding start portion having a wedge-shaped cross section by starting to extrude the rubber from the die which is brought close to the rotation-supporting body and simultaneously starting to rotate the rotation-supporting body to gradually increase an extruding amount of the rubber to a predetermined amount and gradually increase a distance between the die and the rotation-supporting body to a predetermined distance corresponding to a desired thickness of the cylindrical rubber member, a winding step of winding the rubber by maintaining the extruding amount of the rubber at the predetermined amount, and maintaining the distance between the die and the rotation-supporting body at the predetermined distance, and a winding end step of forming a winding end portion having a wedge-shaped cross section on the winding start portion by maintaining the distance between the die and the rotation-supporting body at the predetermined distance and gradually reducing the extruding amount of the rubber from the predetermined amount.

The operation and effect of the method for forming of a cylindrical rubber member having the above-described configuration will be described. When the rubber extruded by the extruder is wound around a rotation-supporting body, if the extruded rubber passes through a clearance between the die and a surface of the rotation-supporting body so as to be rubbed thereon, a thickness of the rubber which has passed therethrough becomes equal to a thickness of the clearance. That is, in the winding start step, an extruding amount of rubber is gradually increased to a predetermined value, and a distance between the die and the rotation-supporting body is gradually increased to a predetermined value. Accordingly, it is possible to form a winding start portion of a wedge-shaped cross section having a thickness which is gradually increased to a predetermined value of the cylindrical rubber member while keeping its width constant. In the winding step, the extruding amount of rubber is maintained at the predetermined value, and a distance between the die and the rotation-supporting body is maintained at the predetermined value. Accordingly, a desired thickness of the wound rubber can be obtained while keeping the width constant. Also in the winding end step, if the distance between the die and the rotation-supporting body is maintained at the predetermined value, a desired thickness of the wound rubber can be obtained. In the winding end step, if the extruding amount of rubber is gradually reduced from the predetermined value, it is possible to form a winding end portion of a wedge-shaped cross section having a gradually reduced thickness, and if the winding end portion is superposed on the winding start portion, it is possible to eliminate a level difference at the joint between the winding start portion and the winding end portion while keeping the width constant. Accordingly, it is possible to eliminate a level difference at the joint between the winding start portion and the winding end portion while keeping the width constant, and form a cylindrical rubber member having a desired thickness over its entire circumference. If the method for forming a cylindrical rubber member of the present invention is used when tires are manufactured, since a level difference at the joint is eliminated, the incorporation of air at the time of vulcanization is not generated, and the uniformity is also enhanced.

In the method for forming a cylindrical rubber member according to the present invention, it is preferable that an extruding amount of the rubber per unit time is set to be equal to a volume obtained by multiplying an area of a clearance between the die and a surface of the rotation-supporting body as viewed from a rotation direction by a moving distance, per unit time, of the surface of the rotation-supporting body, the moving distance being obtained by rotation.

According to this configuration, rubber which passes through the clearance between the die and the surface of the rotation-supporting body is extruded by the extruder in just proportion. Therefore, it is possible to keep the width of rubber constant in any of the winding start step, the winding step, and the winding end step.

In the method for forming of a cylindrical rubber member according to the present invention, it is preferable that, a gear pump having a pair of gears is provided between the extruder and the die, the number of rotations of a screw incorporated in the extruder is PID-controlled such that pressure on an inlet side of the gear pump becomes constant with respect to the number of rotations of the gears which are programmed and operated, and a parameter of the PID control differs between the preparation step, the winding start step, the winding step, and the winding end step.

If the gear pump is rotated and driven while keeping pressure on the inlet side of the gear pump constant, it is possible to extrude, from the die, rubber in an amount corresponding to the number of rotations of the gears. According to the present invention, even if the extruding amount differs between the steps, it is possible to stably keep the pressure on the inlet side of the gear pump constant. Accordingly, even when the extruding amount is changed in the winding start step and the winding end step, it is possible to accurately extrude rubber in a desired extruding amount only by changing the number of rotations of the gears. Therefore, it is possible to precisely form the winding start portion and the winding end portion of wedge-shaped cross sections.

The present invention is particularly useful for forming a cylindrical rubber member of thin and wide cross-sectional shape having a thickness of 3.0 mm or less and a width of 150 mm or more. For example, to form a cylindrical rubber member having thin and wide cross-sectional shape, if an attempt is made to extrude rubber using a die having an opening of a shape corresponding to this cross section, since inlet pressure and output pressure of the die become extremely high, it becomes necessary to make the die large to enhance its strength, and since a temperature of the rubber becomes high, there is a possibility that the rubber burns. According to the present invention having the above operation and effect, however, since the thickness of rubber can be determined based on the distance between the die and the rotation-supporting body, it is unnecessary to make the die large even if the cylindrical rubber member has the thin and wide cross-sectional shape, and it is possible to prevent rubber from burning. According to the conventional extruding method, in order to obtain thin and wide rubber having a uniform thickness, it is necessary to uniformize a flowing speed of rubber when it is discharged from the die. However, in a generally known computer analysis, an analysis result does not completely match with the actual phenomenon, and it has been inevitable to rely on operator's intuition or repeat trial and error for adjusting a flow path of the die, which required time and costs. According to 0, concerning the rubber flowing speed, it is not absolutely necessary that the analysis result and the actual phenomenon match with each other, and if the difference is at least less than 30% over an extruding width direction, it is possible to uniformize the rubber thickness by a method of rubbing the extruded rubber.

In the method for forming of a cylindrical rubber member according to the present invention, it is preferable that, in the preparation step, the die is brought close to the rotation-supporting body as close as 0.1 mm or less.

If the die is brought close to a surface of the rotation-supporting body in the preparation step, a cross section of the winding start portion can be formed into a wedge shape whose tip end is substantially zero. Therefore, it is possible to effectively eliminate the level difference at the joint.

BRIEF DESCRIPTION OF THE DRAWINGS

FIGS. 4(*a*) to 4(*g*) are schematic diagrams showing a manner of forming the cylindrical rubber member.

FIG. 5(*a*) is a graph showing a relation between a rotation angle of a forming drum and an extruding amount of rubber, and FIG. 5(*b*) is a graph showing a relation between the rotation angle of the forming drum and a distance from a die to the forming drum.

MODES FOR CARRYING OUT THE INVENTION

Figure 1:
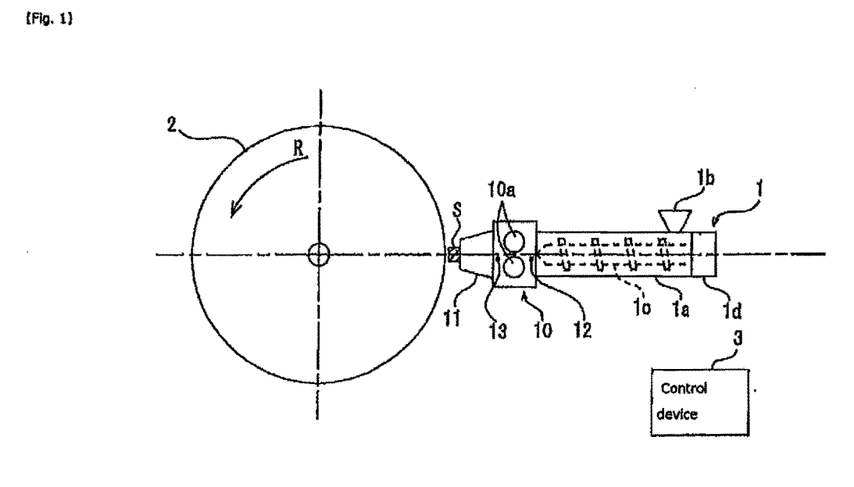
FIG. 1 is a schematic diagram showing one example of a configuration of forming equipment for forming a cylindrical rubber member.

Embodiments of the present invention will be described with reference to the drawings. FIG. 1 is a schematic diagram showing one example of a configuration of forming equipment for forming a cylindrical rubber member. The forming equipment shown in FIG. 1 includes an extruder 1, a gear pump 10, a die 11, a forming drum (corresponding to rotation-supporting body) 2, and a control device 3.

The extruder 1 includes a cylindrical barrel 1*a*, a hopper 1*b* connected to a supply port of the barrel 1*a*, a screw 1*c* which kneads rubber and feeds the rubber toward a tip end of the extruder 1, and a screw motor 1*d* which rotates and drives the screw 1c. The number of rotations of the screw motor 1d is controlled by a control device 3 as will be described later.

The gear pump 10 is connected to a tip end side of the extruder 1 in an extruding direction thereof, and a tip end side of the gear pump 10 is connected to the die 11. Rubber material kneaded by the extruder 1 is supplied to the gear pump 10, and the gear pump 10 supplies a given amount of rubber to the die 11. Rubber S is extruded in a predetermined extruding amount from the die 11.

The gear pump 10 has a pair of gears 10a, and has a function of feeding rubber to an outlet side toward the die 11. The pair of gears 10a is respectively rotated and driven by gear motors (not shown), and the number of rotations of the gears 10a is controlled by the control device 3. By controlling the number of rotations of the gear motors and the number of rotations of the screw motor 1d in association with each other by the control device 3, it is possible to control the extruding amount of the rubber S extruded from the die 11. Although the pair of gears 10a is arranged in a vertical direction in FIG. 1 for the sake of illustration, the gears 10a may actually be arranged in a plane direction (direction in which rotation shaft of gear 10a is oriented in vertical direction in FIG. 1).

A first pressure sensor 12 is provided on an inlet side of the gear pump 10, i.e., a side close to the extruder 1, and the first pressure sensor 12 detects pressure of rubber which is supplied from the extruder 1. A second pressure sensor 13 is provided on an outlet side of the gear pump 10, and the second pressure sensor 13 detects pressure of rubber S extruded from the die 11.

Pressure on the inlet side of the gear pump 10 is determined by a feeding amount of rubber fed by the gears 10a of the gear pump 10 and the screw 1c of the extruder 1. By keeping pressure on the inlet side constant, the gear pump 10 can supply a given amount of rubber to the die 11, and the extruding amount from the die 11 is also stabilized. However, if pressure on the inlet side is unstable, the extruding amount from the die 11 varies, and it becomes difficult to form a cylindrical rubber member having a desired dimension.

As a method of controlling pressure on the inlet side of the gear pump 10, there is known a method in which PID control is performed on the number of rotations of the gears 10a of the gear pump 10 and the number of rotations of the screw 1c of the extruder 1. The PID control is generally used when rubber is extruded continuously in a given amount. The forming method of the present invention includes a plurality of steps such as a preparation step, a winding start step, a winding step, and a winding end step which will be described later, and the extruding amount of rubber differs between these steps. In such a case, if a parameter of the PID control in the winding step in which the number of rotations of the gears 10a is fixed and a predetermined amount of rubber is continuously extruded is used in the winding start step and the winding end step in which the number of rotations of the gears 10a is greatly varied and the extruding amount is greatly varied, it is not possible to keep the pressure on the inlet side constant. Hence, in this embodiment, the parameter of the PID control is made different between the preparation step, the winding start step, the winding step, and the winding end step. More specifically, although the gears 10a do not rotate and are stopped in the preparation step, it is necessary to keep the pressure on the inlet side constant. Therefore, the screw 1c is slightly moved and a variation amount in the number of rotations is small. Therefore, the parameter is determined so that the PID control reacts insensitively. In the winding step, since it is necessary to rotate the gears 10a at high speed and keep the pressure on the inlet side constant, the screw 1c also rotates at high speed. At that time, rubber gradually generates heat due to kneading action, and viscosity of the rubber is also lowered. Under such influence, pressure on the inlet side also tends to lower, and to compensate the lowered pressure, the PID control is conducted to follow influence of disturbance in a high speed region. On the other hand, in the winding start step, a variation amount of the number of rotations of the gears 10a is large, and a programmed operation is conducted from a resting state to the high speed region instantaneously. Nevertheless, to keep the pressure on the inlet side constant, it is necessary to determine the parameter which sensitively reacts so that the number of rotations of the screw 1c also instantaneously follows. In the winding end step, contrary to the winding start step, a programmed operation is conducted so that variation in the gears 10a is instantaneously lowered from the high speed region to the resting state. Also at this time, to keep the pressure on the inlet side constant, it is necessary to determine the parameter which sensitively reacts so that the number of rotations of the screw 1c also instantaneously follows. According to these configurations, the pressure on the inlet side of the gear pump 10 can stably be kept substantially constant in all of the steps.

Figure 6:
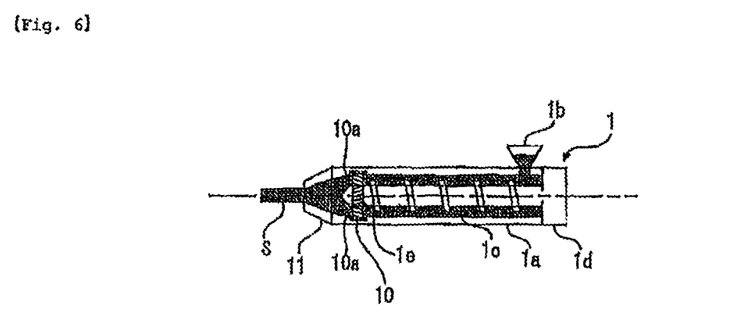
FIG. 6 is a schematic diagram showing a configuration of forming equipment according to another embodiment.

This embodiment shows an example of a so-called external gear pump in which the gear pump 10 is connected to the tip end side of the extruder 1 in the extruding direction. Alternatively, it is also possible to use a gear pump built-in type extruder in which the gear pump is incorporated in the extruder. As shown in FIG. 6, the gear pump-built-in type extruder has a structure in which a gear groove 1e is formed in a tip end of the screw 1c, and the gear groove 1e and the gears 10a of the gear pump 10 mesh with each other so that the gears 10a of the gear pump 10 rotate with rotation of the screw 1c. It is possible to control rotation of the gear pump 10 only by controlling rotation of the screw 1c, and rubber can be extruded in a given amount. In the present invention, as compared with an extruder to which an external gear pump is connected, the gear pump-built-in type extruder is more preferable in that the extruding amount can be easily controlled and that a tip end of the extruder can be made compact since a gear motor is not required.

The forming drum 2 can be rotated by a servomotor 20 (see FIG. 2) in a direction R. The number of rotations of the servomotor 20 is controlled by the control device 3. Rubber extruded through the die 11 is supplied to the forming drum 2, and the rubber can be wound along the circumferential direction by rotating and driving the forming drum 2 in the direction R with the rubber being adhered to the forming drum 2. A pressure roller (not shown) which pressure-bonds rubber supplied to the forming drum 2 may be provided.

Figure 2:
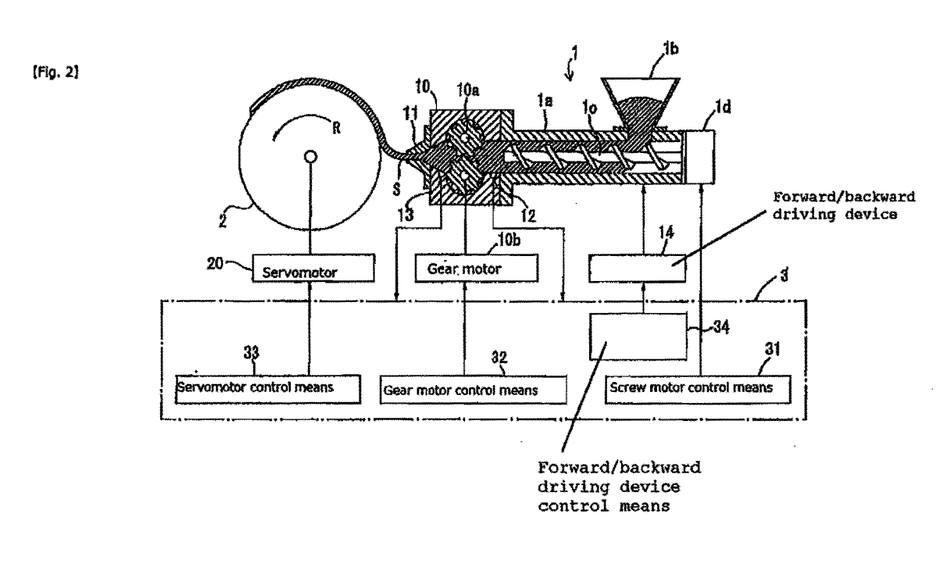
FIG. 2 is a block diagram showing a function of a control system of the forming equipment.

Next, a function of the control system of the forming equipment according to this embodiment will be described with reference to a block diagram in FIG. 2. The control device 3 has a function of controlling operations of various portions of the forming equipment.

Screw motor control means 31 controls the number of rotations of the screw motor 1d of the extruder 1 based on the pressure on the inlet side of the gear pump 10 detected by the first pressure sensor 12. Gear motor control means 32 controls the number of rotations of a gear motor 10b based on a predetermined control program (by coefficient of time). Servomotor control means 33 controls the number of rotations of the servomotor 20.

The extruder 1, the gear pump 10, and the die 11 can integrally be moved forward and backward in the extruding direction by a forward/backward driving device 14, and can move toward and away from the forming drum 2. Such forward and backward movements are also controlled by forward/backward driving device control means 34 of the control device 3.

<Method for Forming Cylindrical Rubber Member>

Next, a method for forming a cylindrical rubber member using the above forming equipment will be described. The method for forming a cylindrical rubber member according to the present invention includes: a preparation step of bringing the die 11 close to the forming drum 2; a winding start step of forming a winding start portion having a wedge-shaped cross section by starting to extrude rubber S from the die 11 which is brought close to the forming drum 2 and simultaneously starting to rotate the forming drum 2 to gradually increase an extruding amount of the rubber S to a predetermined amount and gradually increase a distance between the die 11 and the forming drum 2 to a predetermined distance corresponding to a desired thickness of the cylindrical rubber member; a winding step of winding the rubber S by maintaining the extruding amount of the rubber S at the predetermined amount, and maintaining the distance between the die 11 and the forming drum 2 at the predetermined distance; and a winding end step of forming a winding end portion having a wedge-shaped cross section on the winding start portion by maintaining the distance between the die 11 and the forming drum 2 at the predetermined distance and gradually reducing the extruding amount of the rubber S from the predetermined amount.

Figure 3:
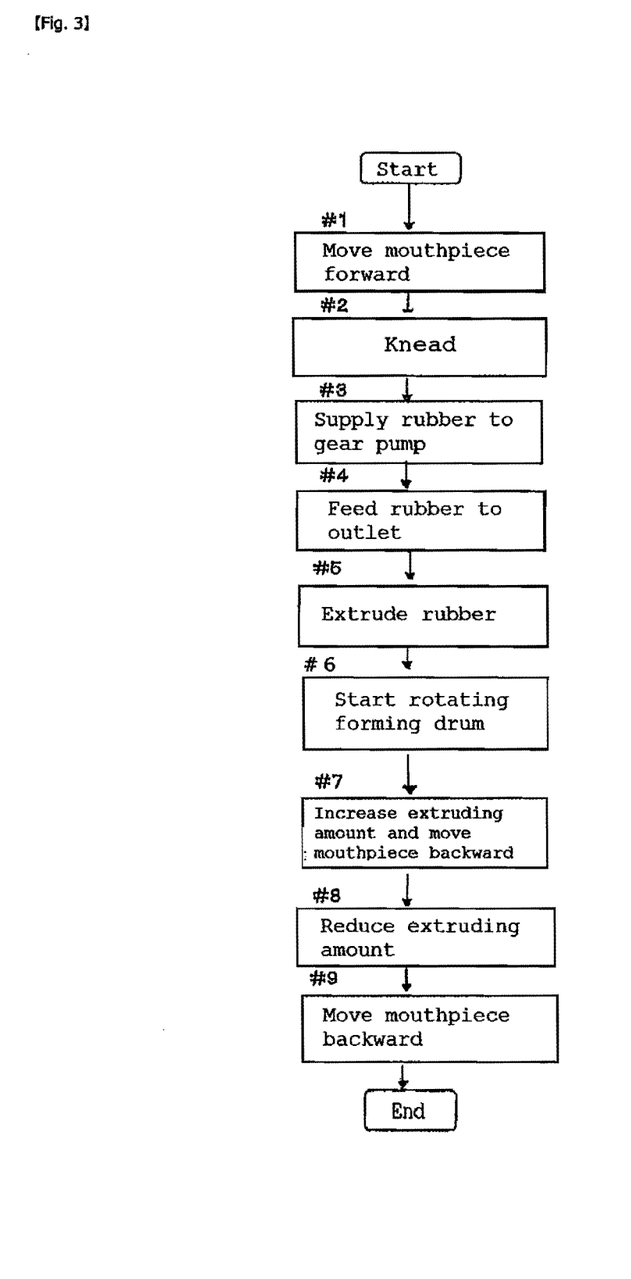
FIG. 3 is a flowchart showing one example of a procedure in forming the cylindrical rubber member.
Figure 4:
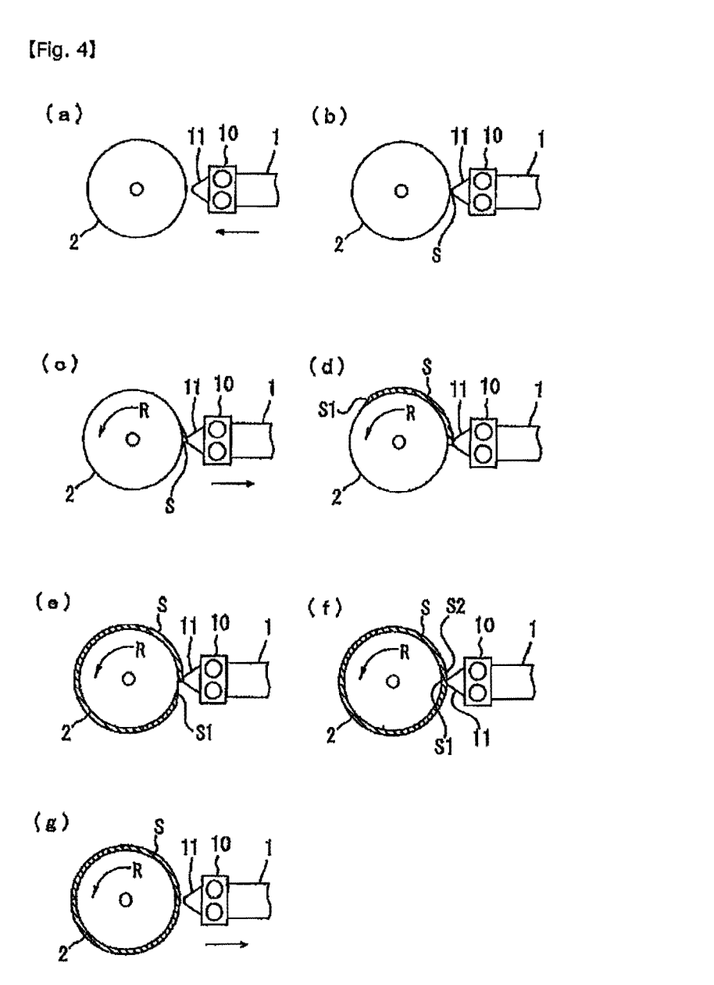
Figure 5:
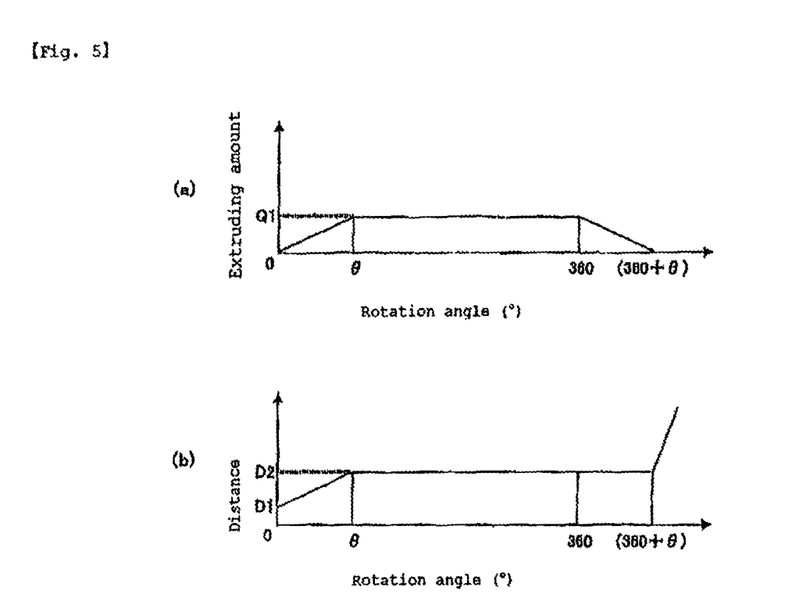

FIG. 3 is a flowchart showing one example of a procedure in forming the cylindrical rubber member. FIGS. 4(*a*) to 4(*g*) are schematic diagrams showing states of forming the cylindrical rubber member. FIG. 5(*a*) shows a relation between a rotation angle of the forming drum 2 and the extruding amount of the rubber S. FIG. 5(*b*) shows a relation between the rotation angle of the forming drum 2 and the distance from the die 11 to the forming drum 2.

First, the extruder 1, the gear pump 10 and the die 11 are integrally moved forward (#1), and the die 11 is brought close to the forming drum 2 as shown in FIG. 4(*a*). At this time, the die 11 is brought close to a surface of the forming drum 2 as close as a predetermined distance D1. It is preferable that D1 is 0.1 mm or less. Timing at which the die 11 is brought close to the forming drum 2 is not particularly limited as long as the predetermined distance is provided until the rubber S is extruded from the die 11.

Next, rubber material of the rubber S adjusted in the previous-step is charged in the hopper 1*b* of the extruder 1. Here, rubber material is not particularly limited. For example, material to be mixed is kneaded by an ordinary method into general rubber raw material such as natural rubber, styrene-butadiene rubber (SBR), butadiene rubber (BR), and isoprene rubber (IR), and the obtained material is adjusted such that the rubber can be crosslinked. A shape of the rubber material to be charged is not particularly limited. Examples of such a shape include a ribbon shape, a sheet shape, and a pellet shape.

The rubber material which is charged into the hopper 1*b* is kneaded by the screw 1*c* of the extruder 1, is fed toward the tip end in the extruding direction, and is supplied to the gear pump 10 (#2, 3). The rubber material supplied to the gear pump 10 is fed to the outlet side toward the die 11 by the pair of rotating gears 10*a* (#4).

The rubber material which is supplied to the die 11 is extruded from an opening of the die 11 as rubber S (#5). If the tip end of the extruded rubber S is adhered to and fixed to an outer surface of the forming drum 2 as shown in FIG. 4(*b*), the forming drum 2 starts rotating and driving as shown in FIG. 4(*c*) (#6). Actually, the extruding motion of the rubber S from the die 11 and rotation of the forming drum 2 are started simultaneously (or substantially simultaneously).

By controlling the number of rotations of the gears 10*a* and the number of rotations of the screw 1*c* substantially simultaneously with start of rotating and driving of the forming drum 2, the extruding amount of the rubber S extruded from the die 11 is gradually increased to the predetermined amount (#7). Further, the extruding amount of the rubber S is increased and the die 11 is gradually moved backward as shown in FIG. 4(*c*), and the distance between the die 11 and the forming drum 2 is gradually increased (#7). Accordingly, a cross section of the winding start portion S1 of the rubber S is formed into the wedge shape.

More specifically, as shown in FIG. 5(*a*), the extruding amount of the rubber S is gradually increased to a predetermined amount Q1 until the rotation angle of the forming drum 2 becomes equal to θ°. Further, as shown in FIG. 5(*b*), the die 11 gradually moves backward until the rotation angle of the forming drum 2 becomes equal to θ°, and the distance between the die 11 and the forming drum 2 is gradually increased from D1 to a predetermined distance D2.

Thereafter, the extruding amount of the rubber S is maintained at the predetermined amount Q1, the distance between the die 11 and the forming drum 2 is maintained at the predetermined distance D2. While keeping this state, the forming drum 2 continues to rotate and drive. Here, the predetermined distance D2 corresponds to a desired thickness of a cylindrical rubber member to be formed, and the extruded rubber S passes through the clearance between the die 11 and the surface of the forming drum 2 and a thickness of the rubber S becomes equal to D2. Accordingly, a cross section of the winding start portion S1 of the rubber S is formed into the wedge shape, and thereafter, the thickness of the rubber S becomes equal to the constant thickness D2 as shown in FIG. 4(*d*).

As shown in FIG. 4(*e*), if the winding start portion S1 of the rubber S comes close to the die 11, the extruding amount of the rubber S extruded from the die 11 is gradually reduced from the predetermined amount Q1 by controlling the number of rotations of the gears 10*a* and the number of rotations of the screw 1*c* (#8).

More specifically, as shown in FIG. 5(*a*), the extruding amount of the rubber S is maintained at the predetermined amount Q1 until the rotation angle of the forming drum. 2 becomes equal to 360°, and the extruding amount of the rubber S is gradually reduced from the predetermined amount Q1 before the rotation angle becomes equal to (360+θ)°. At this time, the distance between the die 11 and the forming drum 2 is maintained at the predetermined distance D2 as shown in FIG. 5(*b*). Accordingly, as shown in FIG. 4(*f*), across section of the winding end portion S2 of the rubber S is formed into the wedge shape, and the rubber S is formed by superposing the winding end portion S2 on the winding start portion S1. Accordingly, a cylindrical rubber member is formed in which a thickness of the joint between the winding start portion S1 and the winding end portion S2 is substantially equal to thicknesses of other portions.

Lastly, as shown in FIG. 4(*g*), the die 11 moves backward, and the forming operation of the cylindrical rubber member is completed (#9).

Other Embodiment

In the present invention, if the extruded rubber S is not directly wound around the forming drum 2 (rotation-supporting body) and another rubber is already wound around the forming drum 2 (rotation-supporting body), it is also possible to wind the rubber S around an outer surface of the other rubber.

Although the extruder 1 is moved forward and backward to move the extruder 1 toward and away from the forming drum 2 in the above embodiment, it is also possible to move the forming drum 2 forward and backward to move the forming drum 2 toward and away from the extruder 1.

DESCRIPTION OF REFERENCE SIGNS 1 extruder
1c screw
2 forming drum
3 control device
10 gear pump
10a gear
11 die
12 first pressure sensor
13 second pressure sensor
14 forward/backward driving device
20 servomotor
D2 predetermined distance
Q1 predetermined amount
S rubber
S1 winding start portion
S2 winding end portion

The invention claimed is:

1. A method for forming a cylindrical rubber member in which rubber extruded by an extruder through a die is wound around a rotation-supporting body, and a winding start portion and a winding end portion are bonded to each other to form a cylindrical shape, the method comprising:
   a preparation step of bringing the die close to the rotation-supporting body;
   a winding start step of forming a winding start portion having a wedge-shaped cross section by starting to extrude the rubber from the die which is brought close to the rotation-supporting body and simultaneously starting to rotate the rotation-supporting body to gradually increase an extruding amount of the rubber to a predetermined amount and gradually increase a distance between the die and the rotation-supporting body to a predetermined distance which is equal to a thickness of the cylindrical rubber member;
   a winding step of winding the rubber by maintaining the extruding amount of the rubber at the predetermined amount, and maintaining the distance between the die and the rotation-supporting body at the predetermined distance; and
   a winding end step of forming a winding end portion having a wedge-shaped cross section on the winding start portion by maintaining the distance between the die and the rotation-supporting body at the predetermined distance and gradually reducing the extruding amount of the rubber from the predetermined amount.

2. The method for forming a cylindrical rubber member according to claim 1, wherein an extruding amount of the rubber per unit time is set to be equal to a volume obtained by multiplying an area of a clearance between the die and a surface of the rotation-supporting body as viewed from a rotation direction by a moving distance, per unit time, of the surface of the rotation-supporting body, the moving distance being obtained by rotation.

3. The method for forming a cylindrical rubber member according to claim 1, wherein
   a gear pump having a pair of gears is provided between the extruder and the die,
   the number of rotations of a screw incorporated in the extruder is PID-controlled such that pressure on an inlet side of the gear pump becomes constant with respect to the number of rotations of the gears which are programmed and operated, and
   a parameter of the PID control differs between the preparation step, the winding start step, the winding step, and the winding end step.

4. The method for forming a cylindrical rubber member according to claim 1, wherein the cylindrical rubber member has a thin and wide cross-sectional shape having a thickness of 3.0 mm or less and a width of 150 mm or more.

5. The method for forming a cylindrical rubber member according to claim 1, wherein in the preparation step, the die is brought close to the rotation-supporting body as close as 0.1 mm or less.

* * * * *